(12) United States Patent
Emberty et al.

(10) Patent No.: US 6,177,790 B1
(45) Date of Patent: Jan. 23, 2001

(54) SYSTEM AND METHOD FOR DISTRIBUTING POWER BETWEEN COMPONENTS VIA A MAGNETIC COUPLING

(75) Inventors: Robert George Emberty; Craig Anthony Klein, both of Tucson, AZ (US)

(73) Assignee: International Business Machines Corporation, Armonk, NY (US)

( * ) Notice: Under 35 U.S.C. 154(b), the term of this patent shall be extended for 0 days.

(21) Appl. No.: 09/477,546

(22) Filed: Jan. 4, 2000

(51) Int. Cl.[7] .................................................. G05B 24/02
(52) U.S. Cl. ............................................................ 323/347
(58) Field of Search .............................. 336/132, DIG. 2; 361/725, 726, 685, 788; 323/264, 347

(56) References Cited

U.S. PATENT DOCUMENTS

| 4,924,171 | 5/1990 | Baba et al. . |
|---|---|---|
| 5,122,729 | * 6/1992 | Itoga et al. ............................ 323/347 |
| 5,157,319 | 10/1992 | Klontz et al. . |
| 5,229,652 | 7/1993 | Hough . |
| 5,325,046 | 6/1994 | Young et al. . |
| 5,341,280 | 8/1994 | Divan et al. . |
| 5,455,467 | 10/1995 | Young et al. . |

* cited by examiner

*Primary Examiner*—Shawn Riley
(74) *Attorney, Agent, or Firm*—Robert M. Sullivan; Felsman, Bradley, Vaden, Gunter & Dillon, LLP

(57) ABSTRACT

A redundant array of independent disk drives (RAID) is coupled to a backplane for interfacing with a computer. Each drive in the array is mounted in a carrier. The backplane has a main power circuit and each carrier has a power conditioning and distribution circuit. Each pair of power circuits interfaces via a connectorless magnetic coupling having a core transformer with two halves. Half of the split core transformer is contained within each of the backplane and the carrier. The main power circuits deliver power to the magnetically coupled split core transformer halves, which then deliver electrical power to their respective power conditioning and distribution circuits on the carriers to provide power to the drives.

4 Claims, 1 Drawing Sheet

SYSTEM AND METHOD FOR DISTRIBUTING POWER BETWEEN COMPONENTS VIA A MAGNETIC COUPLING

BACKGROUND OF THE INVENTION

1. Technical Field

This invention relates in general to magnetic connectors, and in particular to a magnetic coupling for a data access and storage device. Still more particularly, the present invention relates to a backplane for distributing power to a redundant array of independent hard disk drives through a magnetic coupling.

2. Description of Related Art

The individual hard disk drives in a redundant array of independent drives (RAID) typically receive power through a hard-wired connector interface with a backplane. Each of the drives is loaded in a drive carrier, mounted in a drawer in the storage subsystem, and individually connected in parallel to the backplane. Each drive also has a read/write interface, such as a conventional small computer system interface (SCSI) connector, that allows the host computer to access and store data on the drive. Although current power interface hardware is acceptable, an improved apparatus and method for powering arrays of independent disk drives is desirable.

SUMMARY OF THE INVENTION

A redundant array of independent disk drives (RAID) is coupled to a backplane for interfacing with a computer. Each drive in the array is mounted in a carrier. The backplane has a main power circuit and each carrier has a power conditioning and distribution circuit. Each pair of power circuits interfaces via a connectorless magnetic coupling having a core transformer with two halves. Half of the split core transformer is contained within each of the backplane and the carrier. The main power circuits deliver power to the magnetically coupled split core transformer halves, which then deliver electrical power to their respective power conditioning and distribution circuits on the carriers to provide power to the drives.

Accordingly, it is an object of the present invention to provide an improved magnetic connector.

It is another object of the present invention to provide a magnetic coupling for a data access and storage device.

It is yet another object of the present invention to provide a backplane for distributing power to a redundant array of independent hard disk drives through a magnetic coupling.

DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
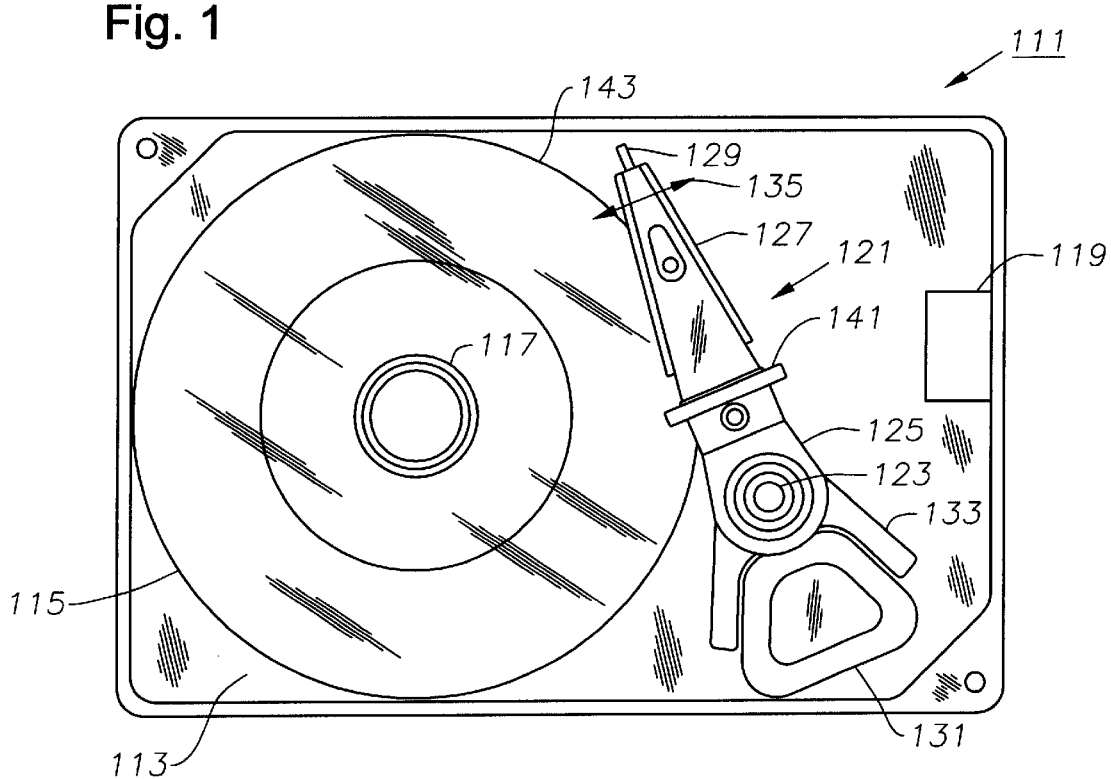
FIG. 1 is a schematic top view of a hard disk drive.

Referring to FIG. 1, a schematic drawing of an information storage system comprising a magnetic hard disk drive 111 for a computer is shown. Drive 111 has an outer housing or base 113 containing a plurality of stacked, parallel magnetic disks 115 (one shown) which are closely spaced apart. Disks 115 are rotated by a motor located therebelow about a central drive hub or spindle 117. A plurality of stacked, parallel actuator arms 121 (one shown) are pivotally mounted to base 113 about a pivot assembly 123. A controller 119 is mounted to the base for selectively moving arms 121 relative to disks 115.

In the embodiment shown, each arm 121 comprises a mounting support 125, a pair of parallel, cantilevered load beams or suspensions 127 extending from each mounting support 125, and a head gimbal assembly 129 having at least one magnetic read/write head secured to each suspension 127 for magnetically reading data from or magnetically writing data to disks 115. Suspensions 127 have a spring-like quality which biases or maintains them in parallel relationship relative to one another. A motor assembly 131 having a conventional voice coil motor is also mounted to pivot assembly 123 opposite head gimbal assemblies 129. Movement of an actuator driver 133 (indicated by arrow 135) moves head gimbal assemblies 129 radially across tracks on the disks 115 until the heads on assemblies 129 settle on the target tracks. The head gimbal assemblies 129 operate in a conventional manner and always move in unison with one another, unless drive 111 uses a split actuator (not shown) wherein the arms move independently of one another.

Figure 2:
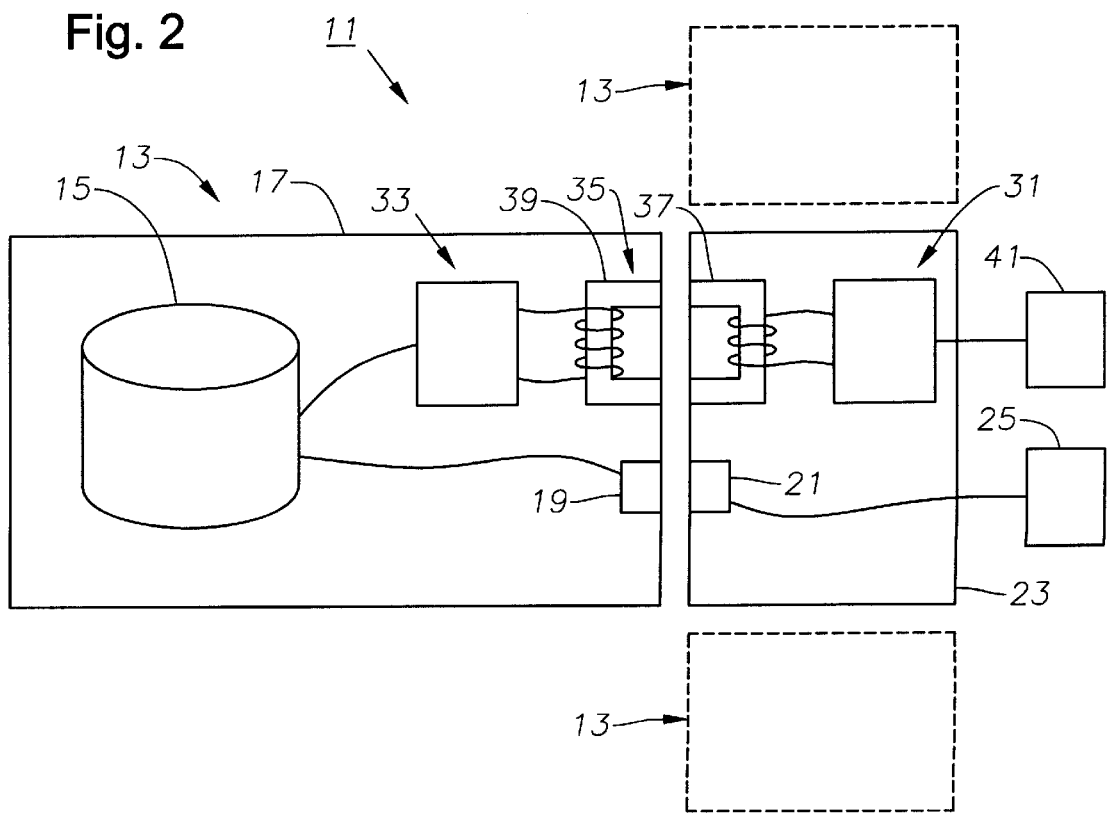
FIG. 2 is a schematic drawing of a portion of a redundant array of independent disk drives of FIG. 1 constructed in accordance with the invention.

Referring to FIG. 2, a system and method distributing power between components is shown. For purposes of illustration, a computer data access and storage system such as hard disk drive storage subsystem 11 is described. However, the system and method of the present invention may also be applied to various other systems and components as well, such as a computer mainframe, tape drives, solid state memory, and optical devices.

In the embodiment shown, a storage subsystem 11 comprises a redundant array of independent disk drive (RAID) assemblies 13, each of which is located in a drawer. In FIG. 2, three identical assemblies 13 are shown, however, two of the assemblies 13 are shown schematically with dashed lines. Each disk drive assembly 13 is hermetically sealed and contains one component or disk drive 15 such as disk drive 111, described above, and those commonly known in the art for accessing and storing data. Each disk drive 15 is mounted to and carried by a tray or carrier 17 for ease of inserting and removing disk drives 15 relative to the drawers in subsystem 11. Each carrier 17 is provided with a communications interface 19, such as a SCSI connector, for interfacing with a mating interface connector 21 on an electrical backplane 23. Interface connector 21 on backplane 23 is electrically connected to a host computer 25.

Backplane 23 also comprises a main power conditioning circuit 31 for interfacing with a power conditioning and distribution circuit 33 on each of the disk drive assemblies 13. Each paired main power conditioning circuit 31 and power conditioning and distribution circuit 33 are associated with and interface via a connectorless magnetic coupling 35 having a split core transformer 37, 39, respectively. The cores or portions of split core transformer 37, 39 are individually and hermetically sealed and, thus, free of physical contact. Split core transformer 37, 39 may comprise either a linear or switching transformer. The main power conditioning circuits 31 deliver power to split core transformer 37 from an electrical power source 41.

When disk drive assembly 13 is located adjacent to, inserted into, or otherwise in close proximity to storage subsystem 11, split core transformer 37 magnetically couples with split core transformer 39 to deliver electrical power to power conditioning and distribution circuit 33 on carrier 17. This magnetic coupling is connectorless and occurs without physical contact between the components. Consequently, circuit 33 provides power to its respective drive 15 via their magnetically coupled interconnection.

The invention has several advantages including the elimination of power connectors on the backplane, thereby providing a connectionless means of powering a redundant array of independent disk drives. In addition, the split core transformer portions and the elements within the disk drive assembly are hermetically sealed. Thus, if the power transformer backplane of the present invention is used in conjunction with optically-based interface connectors, a completely electric-free, wireless union can be achieved between the drive assemblies and the subsystem.

While the invention has been shown or described in only some of its forms, it should be apparent to those skilled in the art that it is not so limited, but is susceptible to various changes without departing from the scope of the invention.

What is claimed is:

1. A data access and storage subsystem for a computer device, comprising:

a backplane having a main power conditioning circuit that is adapted to be connected to a power supply;

a disk drive assembly having a carrier, a disk drive mounted to the carrier, and a power conditioning and distribution circuit connected to the disk drive;

a transformer having a first core portion in the backplane interconnected with the main power conditioning circuit, and a second core portion in the carrier of the disk drive assembly interconnected with the power conditioning and distribution circuit; and wherein when the disk drive assembly is inserted into the subsystem, the first and second core portions of the transformer are magnetically coupled to each other to deliver power from the main power conditioning circuit to the power conditioning and distribution circuit for powering the disk drive.

2. The data access and storage subsystem of claim 1 wherein the disk drive assembly and the first core portion of the transformer are each hermetically sealed.

3. A method for empowering disk drives in an array of independent disk drives, comprising:

(a) providing a backplane with a main power conditioning circuit, and a disk drive assembly with a disk drive and a power conditioning and distribution circuit;

(b) dividing a core of a transformer into a backplane portion on the backplane and a carrier portion on the disk drive assembly;

(c) inserting the disk drive assembly into the subsystem;

(d) providing electrical power to the main power conditioning circuit; and then (e) magnetically coupling the backplane and carrier portions of the core of the transformer such that the disk drive on the disk drive carrier is provided with electrical power.

4. The method of claim 3, further comprising the step of hermetically sealing each of the disk drive assembly and the backplane portion of the core of the transformer.

\* \* \* \* \*